FIG. 1

USE OF BTDA ALONE AS THE CROSSLINKING AGENT.
○ = 200 °C CURING TEMPERATURE
▽ = 220 °C CURING TEMPERATURE
CURE TIME = 24 HRS.

INVENTORS
WALTER P. BARIE, JR.
NORMAN W. FRANKE

FIG. 3

FIG. 4

EFFECT OF CURE TEMPERATURE AND % MALEIC ANHYDRIDE EQUIVALENTS ON HDT.

United States Patent Office 3,324,081
Patented June 6, 1967

3,324,081
POLYEPOXY RESIN-BIARYL ANHYDRIDE COMPOSITION
Walter P. Barie, Jr., Pittsburgh, and Norman W. Franke, Penn Hills Township, Allegheny County, Pa., assignors to Gulf Research & Development Company, Pittsburgh, Pa., a corporation of Delaware
Filed Dec. 31, 1963, Ser. No. 334,716
13 Claims. (Cl. 260—47)

This invention relates to new and useful epoxy resin compositions.

Epoxy resins are well known in the art and comprise a molecule which contains on the average more than one epoxy group. The resins are converted into hard, infusible cross-linked polymers by curing. Curing of the resins may be effected by a catalytic type polymerization process or by a coupling type process. The compositions of the subject invention are formed by the coupling type process wherein the epoxy resin is reacted with polyfunctional cross-linking agents to be defined to couple or cross-link one epoxy resin molecule with another.

The properties of the epoxy resins and the finished polymers will depend, of course, on the nature of the epoxy resin and the cross-linking agents. For some applications, for example encapsulation of parts such as electronic parts, motors, electrical appliances, adhesives, laminates, pottings, etc., it is desirable that the hardened epoxy resin have a high heat distortion temperature. The heat distortion temperature (abbreviated HDT) of an epoxy resin is that temperature at which the epoxy resin composition will deflect 10 mils under a load of 264 p.s.i. (see ASTM D-648-56). According to I. Skeist, "Epoxy Resins," Rheinhold Publishing Corporation, 1958, pages 32 and 51, the heat distortion temperature of a hardened epoxy resin is a function of the density of cross-linking of the resin. The higher the density of cross-linking, the higher the heat distortion temperature. Cross-linked density means the number of primary chemical bonds in a given volume of space occupied by the cured resin. Consequently, the cross-linked density for a given size epoxy molecule is a function of the number of epoxy groups attached to it. For a given number of epoxy functional groups, the smaller over-all molecule should produce hardened resins with higher heat distortion temperatures. In like manner, if the epoxy resin is cured by a coupling type process, the heat distortion temperature is expected to be affected by the total functionality for a given size molecule of the hardening or cross-linking agent. The compositions of the subject invention has unexpectedly high heat distortion temperatures.

In accordance with the invention, new clear epoxy resin compositions of matter having improved heat distortion temperatures have been discovered which comprise an epoxy resin and a biaryl anhydride having at least one anhydride function on each aryl group and wherein the aryl groups are linked through a single carbon atom, and where in said compositions the ratio of the chemical anhydride equivalents to the epoxide equivalents is between 0.4 and 0.65.

In one preferred embodiment of this invention, the new epoxy resin compositions comprise an epoxy resin, maleic anhydride, and a biaryl anhydride having at least one anhydride function on each aryl group and wherein the ary groups are linked through a single carbon atom.

Any of the epoxy resins well known in the art can be employed in the new compositions of this invention. By an epoxy resin is meant any molecule which contains on the average more than one epoxy group. An epoxy group is a three-membered ring containing one oxygen and two carbon atoms. Epoxy resins having molecular weights between about 75 and 4000 are known. The liquid epoxy resins are preferred with the liquid aromatic type epoxy resins being more preferred. The more preferred epoxy resins are generally prepared by the reaction of an epihalohydrin with a polyhydric alcohol or phenol. The reaction products are complex mixtures of polyethers having terminal 1,2-epoxide groups and in which alternating intermediate aliphatic hydroxy-containing radicals are linked through ether oxygens to aliphatic or aromatic nuclei. Other suitable epoxy resins include, for example, butane dioxide and limonene dioxide.

The high molecular weight complex polyether compositions are thermoplastic, but are capable of forming thermosetting compositions by further reaction through the hydroxy and/or 1,2-epoxide groups with a cross-linking agent. In order to form these thermosetting compositions, the epoxy resin must have a 1,2-epoxide equivalency greater than one. By epoxide equivalency is meant the average number of 1,2-epoxide groups contained in the measured molecular weight of the resin. Since the epoxy resin is a mixture of polyethers, the measured molecular weight, upon which the 1,2-epoxide equivalency depends, is necessarily an average molecular weight. Hence, the 1,2-epoxide equivalency of the resin will be a number greater than one, but not necessarily an integer. If the measured molecular weight and epoxide value are given, the 1,2-epoxide equivalency can easily be determined. For example, an epoxy resin having an average molecular weight of 900 and an epoxide value of 0.2 has a 1,2-epoxide equivalency of 1.8.

The epoxide value of an epoxy resin is the number of epoxide groups per 100 grams of resin. This value can be determined experimentally by heating a one gram sample of the epoxy resin with an excess of a pyridine solution of pyridine hydrochloride (obtained by adding sixteen cc's of concentrated hydrochloric acid to a liter of pyridine) at the boiling point for twenty minutes and then back titrating the unreacted pyridine hydrochloride with 0.1 N NaOH to the phenolphthalein end point. In the calculations, each HCl consumed by the resin is considered to be equivalent to one epoxide group.

The preferred epoxy resins are prepared by the reaction of epichlorohydrin with a dihydric phenol and have the general formula:

$$\overset{O}{\underset{CH_2}{\diagdown}}\!\!-\!\!CH\!-\!CH_2(\text{-}O\text{-}R\text{-}O\text{-}CH_2\text{-}\overset{OH}{\underset{|}{C}}H\text{-}CH_2\text{-})_n\text{-}O\text{-}R\text{-}O\text{-}CH_2\text{-}C\overset{O}{\underset{\diagup}{H}}\!\!-\!\!CH_3$$

where R is a divalent aromatic radical and n is an integer between 0 and about 18. As the ratio of the epichlorohydrin to dihydric phenol increases, the value of n decreases.

Bisphenol A [bis(4-hydroxy phenyl) dimethyl methane] is perhaps the dihydric phenol most frequently employed. Thus, R is in the above formula would be:

When n in the above formula is zero, a diglycidyl ether having the following formula results:

The above ether can be obtained when the mol ratio of epichlorohydrin to Bisphenol A is about 10:1. Lower ratios will produce higher molecular weight polyethers. For the preferred resins which have a molecular weight between about 350 and 600, the mol ratio of epichlorohydrin to Bisphenol A can be between about 1:1 and 10:1.

Referring to the general formula above, for the preferred resins, $n$ will vary between 0 and 1. The epoxide equivalent (which is defined as the weight of resin in grams containing 1 gram equivalent of epoxy) should be between about 175 and 300, which is one-half the average molecular weight. The viscosity of the polyether will vary from 3,000 to 30,000 cps. at 25° C. Many commercially available epoxy resins with suitable properties may be employed. For example, suitable resins include "Bakelite ERL–2774"; "Bakelite ERL–3794"; "Epi-Rez 510"; "Epon 820" and "Epon 828." "Bakelite" is the trademark of Union Carbide Corporation; "Epi-Rez" is the trademark of Jones-Dabney Co., Division of Devoe and Raynolds Co.; and "Epon" is the trademark of the Shell Chemical Co.

The epoxy resins used in the compositions of this invention are hardened or cured by the use of at least one anhydride cross-linking agent. The one anhydride is a biaryl anhydride having at least one anhydride function on each aryl group and wherein the aryl groups are linked through a single carbon atom. The preferred biaryl anhydrides are those wherein the aryl groups are phenyl groups. Still more preferred are the biphenyl dianhydrides having one anhydride function on each phenyl group and wherein the phenyl groups are linked through a single carbon atom.

The preferred biphenyl dianhydrides are selected from the group consisting of:

where $x$ and $y$ are monovalent radicals selected from the group consisting of H; and alkyl group having between 1 and 5 carbon atoms; a halogen; OH; OR, where R is an alkyl group having between 1 and 5 carbon atoms; and where R is an alkyl group having between 1 and 5 carbon atoms; and where $R_1$ and $R_2$ are monovalent radicals selected from the group consisting of H; an alkyl group having between 1 and 5 carbon atoms; and a halogen.

Suitable examples of biaryl anhydrides which can be utilized in the compositions of this invention are given below:

3,4,3',4'-diphenylmethane tetracarboylic dianhydride;
2,3,2',3'-diphenylmethane tetracarboxylic dianhydride;
2,3,3',4'-diphenylmethane tetracarboxylic dianhydride;
2-methyl-3,4,3',4'-diphenylmethane tetracarboxylic dianhydride;
2,2'-dimethyl - 3,4,3',4'-diphenylmethane tetracarboxylic dianhydride;
2-ethyl-2'-propyl-3,4,3',4' - diphenylmethane tetracarboxylic dianhydride;
2-amyl-3,4,3',4'-diphenylmethane tetracarboxylic dianhydride;
2-butyl-2' - propyl-3,4,3',4'-diphenylmethane tetracarboxylic dianhydride;
Chloro-3,4,3',4'-diphenylmethane tetracarboxylic dianhydride;
Dichloro-3,4,3',4'-diphenylmethane tetracarboxylic dianhydride;
Bromo-3,4,3',4'-diphenylmethane tetracarboxylic dianhydride;
Dibromo-3,4,3',4'-diphenylmethane tetracarboxylic dianhydride;
2,4,3',4'-benzhydrol tetracarboxylic dianhydride;
2,3,2',3'-benzhydrol tetracarboxylic dianhydride;
2,3,3',4'-benzhydrol tetracarboxylic dianhydride;
2-methyl-3,4,3',4'-benzhydrol tetracarboxylic dianhydride;
2,2'-dimethyl-3,4,3',4'-benzhydrol tetracarboxylic dianhydride;
2-butyl-2'-propyl-3,4,3',4'-benzhydrol tetracarboxylic dianhydride;
3,4,3',4'-benzhydrol tetracarboxylic dianhydride methyl ether;
3,4,3',4'-benzhydrol tetracarboxylic dianhydride ethyl ether;
2,3,3',4'-benzhydrol tetracarboxylic dianhydride propyl ether;
2,3,2',3'-benzhydrol tetracarboxylic dianhydride butyl ether;
3,4,3',4'-benzhydrol tetracarboxylic dianhydride acetate;
3,4,3',4'-benzhydrol tetracarboxylic dianhydride propionate;
2,3,3',4'-benzhydrol tetracarboxylic dianhydride butyrate;
3,4,3',4'-benzophenone tetracarboxylic dianhydride;
2,3,2',3'-benzophenone tetracarboxylic dianhydride;
2,3,3',4'-benzophenone tetracarboxylic dianhydride;
2-methyl-3,4,3',4'-benzophenone tetracarboxylic dianhydride;
2,2'-dimethyl-3,4,3',4'-benzophenone tetracarboxylic dianhydride;
2-ethyl-2'-methyl-3,4,3',4' - benzophenone tetracarboxylic dianhydride;
2-butyl-2'-ethyl-3,4,3',4'-benzophenone tetracarboxylic dianhydride;
2-amyl - 3,4,3',4' - benzophenone tetracarboxylic dianhydride;
2-butyl-2' - propyl-3,4,3',4'-benzophenone tetracarboxylic dianhydride;
2-chloro-2'-methyl-3,4,3',4'-benzophenone tetracarboxylic dianhydride;
2,2'-dichloro-3,4,3',4'-benzophenone tetracarboxylic dianhydride;
2-chloro-3,4,3',4'-benzophenone tetracarboxylic dianhydride;
2-bromo-3,4,3',4' - benzophenone tetracarboylic dianhydride;
2-iodo - 3,4,3',4' - benzophenone tetracarboxylic dianhydride;
2-fluoro-3,4,3',4'-benzophenone tetracarboxylic dianhydride; and
2,5'-dichloro-2',3',3,4-benzophenone tetracarboxylic dianhydride.

If the biaryl anhydrides defined above are used alone as the cross-linking agent for an epoxy resin, then in order to obtain a clear epoxy resin with the highest HDT, it has been found that the ratio of the chemical anhydride equivalents of the biaryl anhydride to the chemical epoxide equivalents of the epoxy resin (the $A/E$ ratio) must be maintained between 0.4 and 0.65 with a preferred ratio between 0.58 and 0.63. At ratios of anhydride to epoxide equivalents less than 0.4, the heat distortion temperatures are not optimum, while at ratios greater than 0.65, the hardened compositions are not clear but grainy and darker in appearance. This is apparently because the biaryl anhydrides of this invention react so quickly that if amounts greater than specified above are employed, a portion will not have time to react before it is encapsulated in the hardened epoxy resin around it. It was expected, however, that the greater amounts of anhydride, that is the higher anhydride to epoxide ratios, would result in finished compositions having the highest heat distortion temperatures since the cross-linking density would be greater. As will be shown more fully in the examples later, it was found unexpectedly, that the highest heat distortion temperatures were obtained when the anhydride to epoxide ratio of equivalents was between 0.58 and 0.63 and in particular a ratio of 0.60.

The biaryl anhydrides used in the compositions of this invention can be employed alone as cross-linking agents for epoxy resins, but due to their highly reactive nature, only the limited amounts noted above can be employed if a clear non-grainy finished product is desired. The biaryl anhydrides of this invention are solids at ordinary temperatures and consequently are difficulty soluble in the epoxy resins. The anhydrides will go into solution in the epoxy resins more easily in a molten condition but the cross-linking activity of these agents and of the resins also increases with increasing temperature. As a consequence, it is extremely difficult or impossible to incorporate more than the amount of the diaryl anhydrides specified above, else the resulting hardened epoxy resin compositions will be grainy in appearance or have heat distortion temperatures lower than possible.

In addition, special techniques are required to incorporate only the biaryl anhydrides with the epoxy resins. For example, the biaryl anhydrides should be in fine powder form so as to be dispersed more fully throughout the epoxy resin to be cured. In order to aid in incorporating the desired amount of the biaryl anhydride in the hardened resin, a modifying anhydride is employed. It has been found that maleic anhydride when used in combination with the biaryl anhydrides described above as a cross linking agent for an epoxy resin results in final compositions having heat distortion temperatures much higher than expected. Normally, a modifying anhydride such as maleic anhydride which is monofunctional would be undesirable since it would be expected to reduce the heat distortion temperature of the final composition since the cross-linking density (on which the heat distortion temperature depends) should be reduced.

The ratio of total chemical anhydride equivalents to epoxide equivalents in the compositions of this invention when maleic anhydride and a biaryl anhydride are employed as the cross-linking agents can be between about 0.4 and about 1, is preferably between 0.50 and 0.90, and more preferably is between 0.62 and 0.85. The optimum total $A/E$ ratio is 0.65. The total chemical anhydride equivalents equal the sum of the equivalent weights of the maleic anhydride and the biaryl anhydride compounds employed. An equivalent weight of anhydride is the weight of anhydride containing one anhydride function. For example, one mol of 3,3',4,4'-benzophenone tetracarboxylic dianhydride, hereinafter referred to as BTDA, would be equal to two anhydride equivalents since it has two anhydride functions, whereas one mol of maleic anhydride would be equal to one anhydride equivalent since it has only one anhydride function per molecule. In a similar manner, a chemical epoxide equivalent is equal to the number of epoxy groups per mol of epoxy resin. For example, a mol of epoxy resin which has two epoxy groups per molecule has a chemical epoxide equivalent of two. From a stoichiometric viewpoint, to obtain complete cross-linking of the epoxy resin, the ratio of the total chemical anhydride equivalents to epoxide equivalents (total $A/E$) should be 1. As cross-linking occurs, however, the density of the resinous composition increases and apparently isolates certain reactive sights which are no longer available for cross-linking. If the excess anhydride groupings are too great, the heat distortion temperature of the final product is decreased. It has, therefore, been found that the ratio of the total chemical anhydride equivalents to epoxide equivalents should be maintained within the ranges defined above. As noted, the preferred cross-linking agent of the compositions of this invention comprises maleic anhydride and a biaryl anhydride as defined above. Pyromellitic dianhydride (PMDA), which has two anhydride functions on a single aromatic ring, is used in the art to prepare hardened epoxy resins having high heat distortion temperatures. PMDA is also a solid and due to its high reactivity and limited solubility, it also preferably requires a modifying anhydride to insure that a sufficient total amount of chemical anhydride equivalents will react substantially completely with the epoxy resin to produce a clear non-grainy product. Since a biphenyl dianhydride is a larger molecule than PMDA, it was expected that cured resins comprising an epoxy resin and a biphenyl dianhydride having one anhydride function on each phenyl ring and a modifying anhydride would have a lower cross-linking density and thus a lower heat distortion temperature than the corresponding epoxy resin cross-linked with PMDA and a similar modifying anhydride. For example, in PMDA, the farthest distance between any two carbonyl groups in the anhydride functions is about 5.95 angstroms, whereas in BTDA the farthest distance is about 10 angstroms, or almost double. When BTDA was used in combination with phthalic anhydride as a modifying anhydride, heat distortion temperatures greater than phthalic anhydride alone but less than those with PMDA-phthalic anhydride combinations were experienced as was expected. When BTDA was used, however, in combination with maleic anhydride as the modifying anhydride, the cured resin for some unknown reason had a heat distortion temperature much higher than expected and, in fact, the heat distortion temperatures were essentially as high or higher than those obtained using a combination of pyromellitic dianhydride and maleic anhydride as the cross-linking agent.

The amount of maleic anhydride to employ in admixture with the biaryl anhydride is also important. As was noted above, using a biaryl anhydride alone as the cross-linking agent, an $A/E$ ratio greater than 0.65 could not be achieved if a clear epoxy resin were desired. Clear epoxy resin compositions having total $A/E$ ratios of 0.95 have been prepared using maleic anhydride and a biaryl anhydride [specifically 3,3',4,4'-benzophenone tetracarboxylic dianhydride (BTDA)]. At total $A/E$ ratios of greater than about 0.65, the amount of maleic anhydride should be sufficient to aid in cross-linking the biaryl anhydride with the epoxy resin to obtain a clear non-grainy finished product. In addition, the presence of maleic anhydride provides for longer pot life, that is, more time before the resin composition solidifies, even for epoxy resin compositions where the total $A/E$ ratio is less than 0.65. It appears then that at $A/E$ ratios of less than 0.65, you can use BTDA alone with the best ratio being 0.60. At $A/E$ ratios greater than 0.65, a modifying anhydride is required and maleic anhydride gives unexpectedly superior results. However, a modifying anhydride such as maleic anhydride can be used even at total $A/E$ ratios of 0.65 and lower with certain advantages such as longer pot life before solidification.

In general, the equivalents of maleic anhydride can vary between about 1 and 75, and preferably between 10 and 70, percent of the total chemical anhydride equivalents. The more preferred amount of maleic anhydrive equivalents to employ depends on the particular total $A/E$ ratio in the final composition. As the total $A/E$ ratio increases, the optimum amount of maleic anhydride to employ in admixture with the biaryl anhydride also increases.

It has been found that for any given total $A/E$ ratio between the limits given above, hardened epoxy resins having optimum HDT's are obtained in accordance with the formula:

$$A/E \times Z = K$$

where A is the total chemical anhydride equivalents in the composition; E is the expoxide equivalents in the composition; Z is the percent biary anhydride equivalents in admixture with maleic anhydride; K is a number having a value between 40 and 55; and the ratio $A/E$ has a value within the limits defined above. When $A/E$ is greater than 0.75, K preferably has a value between 40 and 50. When $A/E$ is less than 0.75, then K preferably has a value between 45 and 55.

It has also been found that the activity of the biaryl anhydride is a function of the free acid content of the anhydride. It is preferred that the biaryl anhydride be substantially free of carboxylic acid groups, and in any case, the percent free acids in the biaryl anhydride should be less than 6 weight percent, and preferably less than about 2 weight percent.

The epoxy resin compositions of this invention can be prepared by any method well known in the art. One suitable procedure is to heat the epoxy resin to a temperature of between 140° and 180° C. and add thereto with stirring the biaryl anhydride or the admixture of maleic anhydride and the biaryl anhydride.

It has also been found that the procedure for mixing and curing epoxy resins using a mixture of the maleic anhydride and the biaryl anhydride as the cross-linking agent is important when the ratio of anhydride equivalents of BTDA to MA is greater than 9:1 in order to obtain a reasonable pot life for the resin (that is, more than five minutes). As noted above, the normal curing procedure is to blend together the maleic anhydride and the biaryl anhydride solids and add this mixture of solids to the liquid heated epoxy resin. When the ratio of anhydride equivalents of BTDA to MA is greater than about 9:1, the maleic anhydride should be added first to the heated epoxy resin and the biaryl anhydride thereafter added to achieve a reasonable pot life. The time for complete solution of the anhydrides will depend in part on the particle size of the anhydrides. In general, shorter solution times are required for the finer milled anhydrides.

Properties of the hardened epoxy resins are affected by the curing conditions wherein more complete cross-linking occurs. Curing can occur at temperatures between about 150° and 280° C. for time periods as short as five minutes to times as long as two days or more. In general, the higher the curing temperature, the shorter the time required to produce a completely cured epoxy resin product. Before the resin initially solidifies, it can be poured into any suitable mold and be cured under any desirable set of time-temperature conditons. The heat distortion temperature is one of the properties of the final resin which depends in part on the curing temperature employed. The preferred curing temperatures to obtain the highest heat distortion temperatures are between 150° and 240° C. at cure times between 4 and 72 hours with preferred cure times between 8 and 24 hours.

If desired, diluents and fillers well known in the art can be added to the compositons of this invention. These materials are described, for example, in Chapter 6 of the book "Epoxy Resins—Their Applications and Technology" by H. Lee and K. Neville, McGraw-Hill Book Company, Inc., 1957. Diluents include materials such as monoepoxides and other free-flowing liquids to reduce viscosity. Amounts between 5 and 20 parts per hundred parts of resin (phr.) can be used, with preferred amounts between 5 and 10 phr. Fillers are non-reactive neutral materials such as aluminum oxide, atomized metals, mica and asbestos. Amounts between one weight percent of the resin to several times the weight of the resin can be employed.

In addition, various well-known cure accelerators, such as tertiary amines, can be added to the compositions. Suitable accelerators include alphamethyl benzyl dimethylamine; dimethylaminopropylamine; dimethylaminomethyl phenols (DMP-10 by Rohm and Haas); and tris (dimethylaminomethyl) phenol (DMP-30). Strongly acidic materials, such as boron trifluoride, can also be used.

The invention will be further described with reference to the following experimental work.

In all of the series of epoxy resin compositions to be discussed below, the epoxy resin employed was Epon 828, a commercial liquid aromatic type epoxy resin sold by Shell Chemical Company which has an epoxide equivalent of 175–210 and a viscosity (cps.) at 25° C. between 10,000 and 20,000. The epoxide equivalent is defined as the weight of epoxy resin containing one equivalent weight of epoxide. Epon 828 is characterized as the reaction product of bisphenol A and epichlorohydrin.

A first series of epoxy resin compositions were prepared using Epon 828 as the epoxy resin and BTDA as the cross-linking agent at varying $A/E$ ratios. An $A/E$ ratio is, again, the equivalents of anhydride per equivalent of epoxide in the epoxy resin composition. The BTDA was milled to a fine powder (less than 325 mesh size) and stirred into a heated (170°–180° C.) portion of the epoxy resin. The resin was observed to thicken with time as the BTDA became incorporated into the resin. Before final solidification of the epoxy resin composition, it was poured into suitable molds for the formation of test strips in accordance with ASTM test D-648-56. The epoxy resin compositions were cured, that is, maintained at a temperature of either 200° or 220° C. for 24 hours. Table I shows the data for this series of runs.

TABLE I.—EFFECT OF ANHYDRIDE/EPOXIDE RATIO AND CURE TEMPERATURE USING BTDA ALONE AS THE CROSS-LINKING AGENT

| 1st Series Example No. | Anhydride/ Epoxide | Wt. BTDA/ 100 phr.[1] | Cure Temp., °C. | HDT °C. (ASTM D-648) |
|---|---|---|---|---|
| 1 | 0.50 | 40.3 | 200 | 263 |
| 2 | 0.60 | 48.3 | 200 | 283 |
| 3 | 0.625 | 50.5 | 200 | 266 |
| 4 | 0.40 | 32.2 | 220 | 176 |
| 5 | 0.50 | 40.3 | 220 | 266 |
| 6 | 0.60 | 48.3 | 220 | 293 |
| 7 | 0.65 | 52.3 | 220 | 279 |

[1] Parts per hundred parts of resin.

Epoxy resin compositions having $A/E$ ratios of 0.7 and greater were attempted, but dark grainy compositions were obtained which solidified before they could be clarified and poured into the molds. Referring to Table I, it can be seen the heat distortion temperature is highest at an $A/E$ ratio of 0.6. It can also be seen that a curing temperature of 220° C. results in epoxy resin compositions having higher heat distortion temperatures.

A second series of epoxy resin compositions were prepared using Epon 828 and either maleic or phthalic anhydride as the cross-linking agents. The results are given in Table II below:

TABLE II

| Second Series Example No. | Cross-Linking Agent | Curing Time (hrs.) | Conditions, Temp., °C. | HDT (° C.) (ASTM D-648) |
|---|---|---|---|---|
| 1 | Phthalic Anhydride | 24 | 150 | 147 |
| 2 | Maleic Anhydride | Too brittle to run—Sample distorted during curing. | | |

The anhydride to epoxide ratio (A/E) for the second series was 0.95.

A third series of epoxy resin compositions were made comprising an epoxy resin, maleic anhydride (MA) and benzophenone tetracarboxylic dianhydride (BTDA). Epon 828 (100 grams) was heated to about 150° C. and a powdered mixture of BTDA and MA in varying amounts and in varying ratios of BTDA to MA was added with stirring to the hot epoxy resin. The time for complete solution or incorporation of the anhydride into the resin was between five and ten minutes, depending on the particle size of the anhydrides. The pot life of compositions at low BTDA/MA ratios at 150° C. was about 35 to 45 minutes. The pot life is the amount of time required for the epoxy resin to cross-link and solidify. Pot life decreases as the percentage BTDA increases, and, when the BTDA to MA weight ratio was greater than about 9:1, the pot life was too short for practical use when the mixture of BTDA and MA was added to the hot epoxy resin. As noted above, however, an extended pot life was achieved even for the high BTDA to MA mixtures by simply adding the MA first to the epoxy resin and thereafter adding the BTDA to the admixture of MA and epoxy resin. Table III below contains the data for these compositions.

mixture with MA times the total A/E ratio is equal to a value between 40 and 55.

Table IV below is compiled from the data in Table III and shows those compositions having optimum HDT's for varying total A/E ratios.

TABLE IV.—OPTIMUM HDT FOR VARYING TOTAL A/E RATIOS

| Example No. from Table III | Total A/E | Optimum HDT, ° C. | K |
|---|---|---|---|
| 18 | 0.50 | 278 | 45 |
| 19 | 0.55 | 280 | 49.5 |
| 20 | 0.60 | 274 | 54 |
| 16 | 0.65 | 288 | 49 |
| 12 | 0.75 | 286 | 45 |
| 9 | 0.85 | 270 | 42.5 |
| 10 | 0.59 | 252 | 47.5 |

Referring to Table IV, it can be seen that when the total A/E is less than 0.75, the preferred value for K is between 45 and 55. When the total A/E is greater than 0.75, the preferred value for K is between 40 and 50.

TABLE III.—EFFECT OF TOTAL A/E AND WEIGHT PERCENT EQUIVALENTS OF BTDA AND MALEIC ANHYDRIDE ON THE HDT OF EPON 828

| Third Series Example No. | Weight in grams/100 phr. | | Total A/E | Percent of Total Chemical Anhydride Equivalents as— | | K | HDT in ° C.— Cured at 200° C. for 24 hours |
|---|---|---|---|---|---|---|---|
| | BTDA | Maleic Anhydride | | BTDA Equivalents (Z) | Maleic Anhydride Equivalents | | |
| 1 | 20.0 | 24.5 | 0.75 | 33⅓ | 66⅔ | 25 | 232 |
| 2 | 22.7 | 27.8 | 0.85 | 33⅓ | 66⅔ | 28 | 227 |
| 3 | 25.5 | 31.0 | 0.95 | 33⅓ | 66⅔ | 32 | 230 |
| 4 | 24.2 | 22.0 | 0.75 | 40 | 60 | 30 | 250 |
| 5 | 27.4 | 25.0 | 0.85 | 40 | 60 | 34 | 258 |
| 6 | 30.6 | 28.0 | 0.95 | 40 | 60 | 38 | 244 |
| 7 | 26.3 | 15.9 | 0.65 | 50 | 50 | 32.5 | 248 |
| 8 | 30.2 | 18.4 | 0.75 | 50 | 50 | 37.5 | 280 |
| 9 | 34.2 | 20.9 | 0.85 | 50 | 50 | 42.5 | 270 |
| 10 | 38.3 | 23.3 | 0.95 | 50 | 50 | 47.5 | 252 |
| 11 | 31.4 | 12.8 | 0.65 | 60 | 40 | 39 | 280 |
| 12 | 36.3 | 14.7 | 0.75 | 60 | 40 | 45 | 286 |
| 13 | 41.1 | 16.7 | 0.85 | 60 | 40 | 51 | 260 |
| 14 | 31.1 | 6.8 | 0.55 | 75 | 25 | 41 | 236 |
| 15 | 36.2 | 7.4 | 0.60 | 75 | 25 | 45 | 270 |
| 16 | 39.3 | 8.0 | 0.65 | 75 | 25 | 49 | 288 |
| 17 | 45.1 | 9.3 | 0.75 | 75 | 25 | 56 | 270 |
| 18 | 36.2 | 2.4 | 0.50 | 90 | 10 | 45 | 278 |
| 19 | 39.9 | 2.7 | 0.55 | 90 | 10 | 49.5 | 280 |
| 20 | 43.5 | 3.0 | 0.60 | 90 | 10 | 54 | 274 |

Referring to Table III, the optimum HDT's for the compositions of this invention are obtained when the total A/E ratios are between 0.5 and 0.9. Table III also shows that for any particular mixture of BTDA and MA, wherein the percent equivalents of MA in admixture with the BTDA varies between 0 and 66⅔ percent, the optimum HDT for the cured epoxy resin depends on the total A/E ratios in the composition. Thus, when a mixture of MA and BTDA is employed as the cross-linking agent wherein 25 percent of the total anhydride equivalents is maleic anhydride, the optimum HDT of the cured epoxy resin is obtained when the total A/E ratio is about 0.65 (see Example 16 on Table III).

Referring again to Table III, it can be seen that for any particular total A/E ratio, there is an optimum amount of MA to obtain the highest heat distortion temperature. The optimum percent of the total anhydride equivalents as MA equivalents appears to decrease as the A/E ratio decreases. From a consideration of all of the data in Table III, the optimum heat distortion temperature for the epoxy resin compositions of this invention depends on the total A/E ratio and the amount of MA (or conversely BTDA) in the mixture. Empirically, epoxy resin compositions having optimum heat distortion temperatures are obtained, as noted above, when the percent equivalents of BTDA (Z in the above formula) in ad- Comparing the results of the compositions in series 1, 2 and 3, it can be seen that the compositions of this invention comprising an epoxy resin, maleic anhydride and BTDA have much higher heat distortion temperatures than expected. That is, the heat distortion temperature of an epoxy resin using MA as the cross-linking agent was not obtainable, the optimum heat distortion temperature of the same epoxy resin using only BTDA as the cross-linking agent was 283° C., while the heat distortion temperature of the same epoxy resin was as high as 288° C. under the same curing conditions using a mixture of BTDA and MA at a total A/E ratio of 0.65 where 75 percent of the anhydride equivalents were BTDA.

It is also seen from the data in Table III that much higher total A/E ratios can be achieved with mixtures of BTDA and MA than with BTDA alone. All of the resins prepared with MA and BTDA were clear. The optimum total A/E ratio using MA and BTDA is about 0.65.

A fourth series of epoxide compositions were made at a total A/E ratio of 0.85 with varying amounts of BTDA and at curing temperatures between 160° C. and 240° C. for 24 hours. The results are shown in Table V below. It can be seen that the optimum curing temperature is about 220° C.

TABLE V.—EFFECT OF CURING CONDITIONS AND WEIGHT PERCENT EQUIVALENTS OF BTDA AND MA ON THE HDT AT A TOTAL A/E RATIO OF 0.85 AND A CURE TIME OF 24 HOURS

| Fourth Series Example No. | Percent of Total Chemical Anhydride Equivalents as— | | HDT in ° C. at a Cure Temperature in ° C. of— | | | | |
|---|---|---|---|---|---|---|---|
| | BTDA | MA | 160 | 180 | 200 | 220 | 240 |
| 1 | 33⅓ | 66⅔ | 150 | | | | |
| 2 | 33⅓ | 66⅔ | | 230 | | | |
| 3 | 33⅓ | 66⅔ | | | 227 | | |
| 4 | 40 | 60 | 220 | | | | |
| 5 | 40 | 60 | | 234 | | | |
| 6 | 40 | 60 | | | 258 | | |
| 7 | 40 | 60 | | | | 282 | |
| 8 | 40 | 60 | | | | | 250 |
| 9 | 50 | 50 | 225 | | | | |
| 10 | 50 | 50 | | 245 | | | |
| 11 | 50 | 50 | | | 270 | | |
| 12 | 50 | 50 | | | | 290 | |
| 13 | 50 | 50 | | | | | 260 |
| 14 | 60 | 40 | | | 260 | | |

A fifth series of epoxy resin compositions were prepared at a total $A/E$ ratio of 0.85 to show the effect of the type of modifying anhydride on the heat distortion temperature of the cured epoxy resin (Epon 828). The resins were prepared as per the procedure with the third series described above. The results are shown in Table VI below.

TABLE VI.—EFFECT OF MODIFYING ANHYDRIDE ON HDT OF CURED EPOXY RESINS (EPON 828)

$$\frac{\text{Anhydride}}{\text{Epoxide}} = \frac{0.85}{1}$$

| Fifth Series Example No. | Modifying Anhydride | BTDA Mod. An. | PMDA Mod. An. | Curing Conditions | | HDT ° C. (ASTM D-648) |
|---|---|---|---|---|---|---|
| | | | | Time (hrs.) | Temp., ° C. | |
| 1 | Maleic (MA) | 2/3 | | 24 | 180 | 234 |
| 2 | Phthalic (PA) | 2/3 | | 24 | 180 | 154 |
| 3 | Nadic methyl (NMA) | 1/1 | | 24 | 180 | 124 |
| 4 | MA | | 2/3 | 24 | 180 | 225 |
| 5 | PA | | 2/3 | 24 | 180 | 164 |
| 6 | MA | 2/3 | | 24 | 220 | 282 |
| 7 | Succinic (SA) | 2/3 | | 24 | 220 | 165 |
| 8 | MA | | 2/3 | 24 | 220 | 278 |
| 9 | SA | | 2/3 | 24 | 220 | 180 |

A comparison of Example 1 of the fifth series with Example 4 shows that maleic anhydride (MA) has a greater effect in increasing the heat distortion temperature of the epoxy resin composition when used with BTDA than when used in the same amount and under the same conditions with pyromellitic dianhydride (PMDA), despite the fact that PMDA is a much smaller molecule as discussed above which should result in a higher density of cross-linking. A comparison of Examples 6 and 8 of the fifth series further corroborates this unexpected result.

A comparison of Examples 2 and 5 of the fifth series shows that phthalic anhydride (PA) when used in combination with BTDA results in a lower heat distortion temperature than PA used with PMDA.

Examples 3 and 7 show that modifying anhydrides other than MA do not coact with the biaryl anhydrides of this invention to produce epoxy resin compositions with unexpectedly high heat distortion temperatures. Comparing Examples 6 and 7 of the fifth series shows that succinic anhydride (SA) which is similar in structure to MA results in epoxy resin compositions with heat distortion temperatures of 165° versus 282° C. for MA.

A comparison of Examples 7 and 9 shows again the effect of modfying anhydrides other than maleic with PMDA and BTDA. Again, as with PA above, the heat distortion temperature is higher using a PMDA-SA mixture (180° C.) than when using a BTDA-SA mixture (165° C.).

Resort may be had to such variations and modifications as fall within the spirit of the invention and the scope of the appended claims.

We claim:
1. A new composition capable of being cured to a clear hard resin without the addition of a suspending agent and having an improved heat distortion temperature which comprises:
   a 1,2-epoxy resin which contains on the average more than one 1,2-epoxy group per molecule, and
   a biphenyl anhydride selected from the group consisting of:

where $x$ and $y$ are monovalent radicals selected from the group consisting of H; an alkyl group having between 1 and 5 carbon atoms; a halogen; OH; OR, where R is an alkyl group having between 1 and 5 carbon atoms; and where R is as defined; and where $R_1$ and $R_2$ are monovalent radicals selected from the group consisting of H; an alkyl group having between 1 and 5 carbon atoms; and a halogen, and wherein said composition, the ratio of the chemical anhydride equivalents to the epoxide equivalents is between 0.58 and 0.63.

2. A composition of matter according to claim 1 wherein the biphenyl anhydride in benzophenone tetracarboxylic dianhydride.

3. A composition of matter according to claim 1 wherein the epoxy resin is prepared by the reaction of an epihalohydrin with a dihydric phenol to produce a compound having the general formula:

where R is a divalent aromatic radical and $n$ is an integer between 0 and about 18.

4. A composition of matter according to claim 3 wherein the biphenyl anhydride is benzophenone tetracarboxylic dianhydride and the ratio of the chemical anhydride equivalents to the epoxide equivalents is about 0.60.

5. A new composition capable of being cured to a clear hard resin having an improved heat distortion temperature comprising:
   a 1,2-epoxy resin which contains on the average more than one 1,2-epoxy group per molecule,
   maleic anhydride, and
   a biphenyl anhydride selected from the group consisting of:

where $x$ and $y$ are monovalent radicals selected from the group consisting of H; an alkyl group having between 1 and 5 carbon atoms; a halogen; OH; OR, where R is an alkyl group having between 1 and 5 carbon atoms; and where R is as defined; and where $R_1$ and $R_2$ are monovalent radicals selected from the group consisting of H; an alkyl group having between 1 and 5 carbon atoms; and a halogen, and wherein said composition the ratio of the total chemical anhydride equivalents to the epoxide equivalents is between 0.4 and 1, and wherein said composition the equivalents of maleic anhydride are between about 1 and 75 percent of the total chemical anhydride equivalents.

6. A composition of matter according to claim 5 wherein the ratio of the chemical anhydride equivalents to the epoxide equivalents is between 0.5 and 0.9 and wherein the equivalents of maleic anhydride are between 10 and 70 percent of the total chemical anhydride equivalents.

7. A composition of matter according to claim 5 wherein the equivalents of maleic anhydride are determined in accordance with the formula:

$$A/E \times Z = K$$

where A is the total chemical anhydride equivalents in the composition; E is the epoxide equivalents in the composition; Z is the percent biphenyl anhydride equivalents in admixture with the maleic anhydride; and K is a number having a value between 40 and 55.

8. A composition of matter according to claim 7 wherein the epoxy resin is prepared by the reaction of an epihalohydrin with a dihydric phenol to produce a compound having the general formula:

where R is a divalent aromatic radical and $n$ is an integer between 0 and about 18.

9. A composition of matter according to claim 8 wherein the biphenyl anhydride is benzophenone tetracarboxylic dianhydride.

10. A composition of matter according to claim 8 wherein the ratio of the total chemical anhydride equivalents to the epoxide equivalents is less than 0.75 and wherein K has a value between 45 and 55.

11. A composition of matter according to claim 8 wherein the ratio of the total chemical anhydride equivalents to the epoxide equivalents is greater than 0.75 and wherein K has a value between 40 and 50.

12. A process for the preparation of an epoxy resin composition comprising:
   a 1,2-epoxy resin which contains on the average more than one 1,2-epoxy groups per molecule,
   maleic anhydride, and
   a biphenyl anhydride selected from the group consisting of:

where $x$ and $y$ are monovalent radicals selected from the group consisting of H; an alkyl group having between 1 and 5 carbon atoms; a halogen; OH; OR, where R is an alkyl group having between 1 and 5 carbon atoms; and $$-O-\overset{O}{\underset{\|}{C}}-R$$

where R is as defined; and where $R_1$ and $R_2$ are monovalent radicals selected from the group consisting of H; an alkyl group having between 1 and 5 carbon atoms; and a halogen, and wherein said composition the ratio of the anhydride equivalents of the biphenyl anhydride to the maleic anhydride is greater than 9:1, the improvement which comprises:
   adding the biphenyl anhydride to a heated admixture of said epoxy resin and maleic anhydride.

13. A process according to claim 12 wherein the admixture of epoxy resin and maleic anhydride is heated to a temperature between 140° and 180° C.

References Cited

UNITED STATES PATENTS

| 2,948,705 | 8/1960 | Robinson | 260—47 |
| 2,965,610 | 12/1960 | Newey | 260—47 |
| 3,025,263 | 3/1962 | Lee et al. | 260—47 |
| 3,078,279 | 2/1963 | McCracken et al. | 260—47 |
| 3,108,085 | 10/1963 | Broadhead | 260—75 XR |
| 3,190,856 | 6/1965 | Lavin et al. | 260—78 XR |

OTHER REFERENCES

Lee et al.: "Epoxy Resins," McGraw-Hill Book Co., N.Y., July 7, 1957, pp. 15 and 126–133 relied on.

WILLIAM H. SHORT, *Primary Examiner.*

T. D. KERWIN, *Assistant Examiner.*

UNITED STATES PATENT OFFICE
CERTIFICATE OF CORRECTION

Patent No. 3,324,081                                            June 6, 1967

Walter P. Barie, Jr., et al.

It is hereby certified that error appears in the above numbered patent requiring correction and that the said Letters Patent should read as corrected below.

Figure 1:
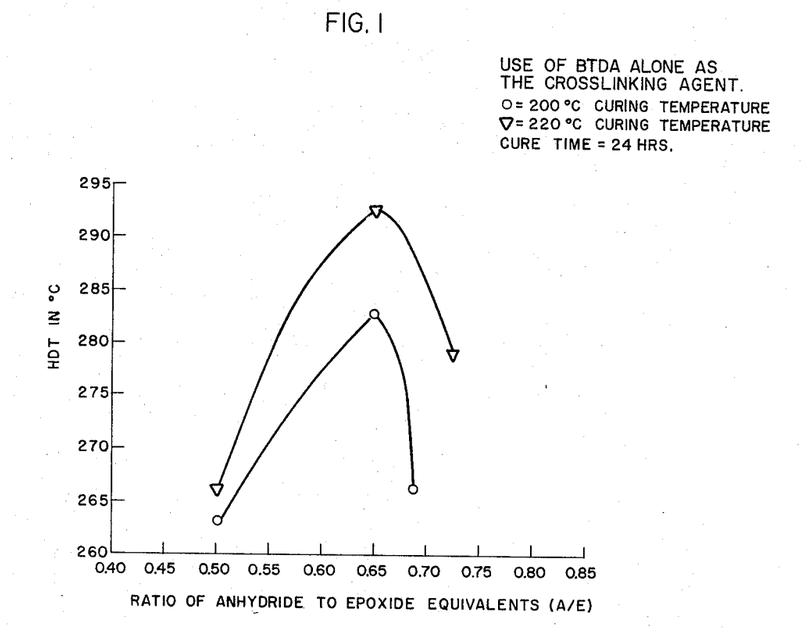
Figure 2:
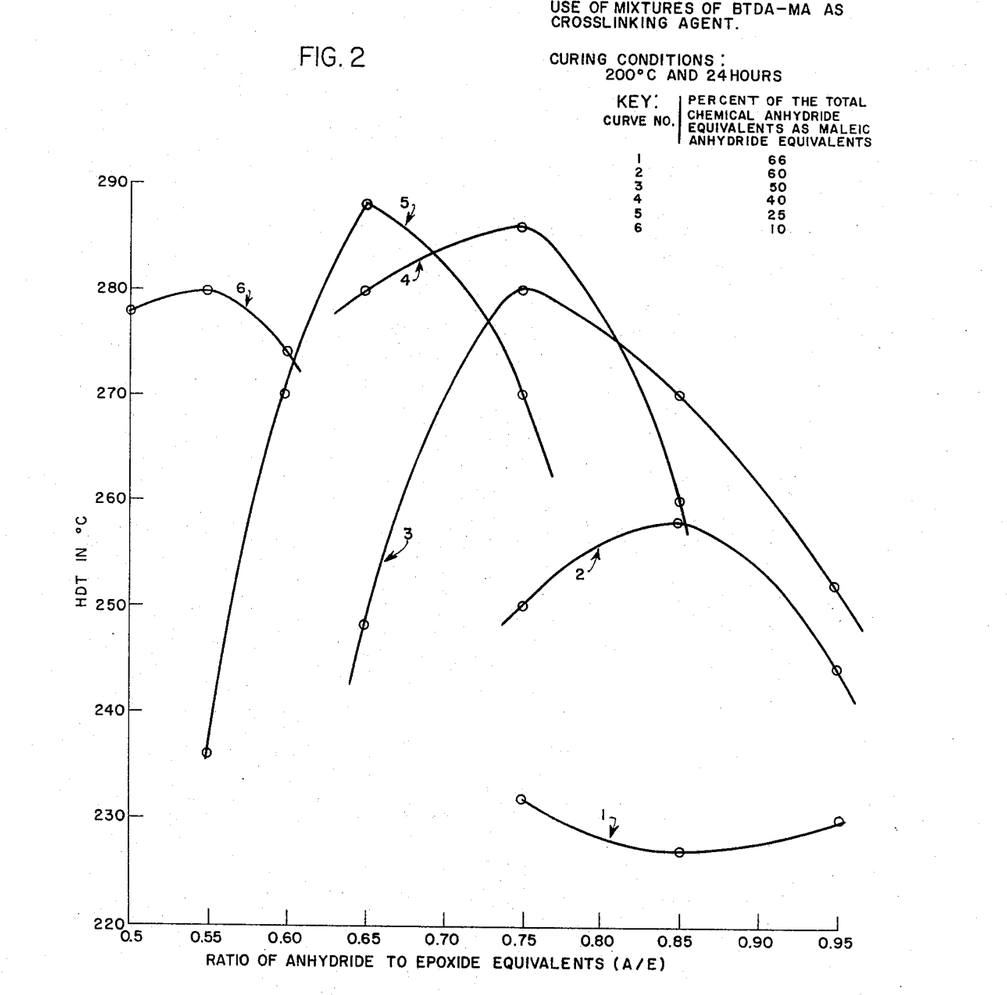
Figure 3:
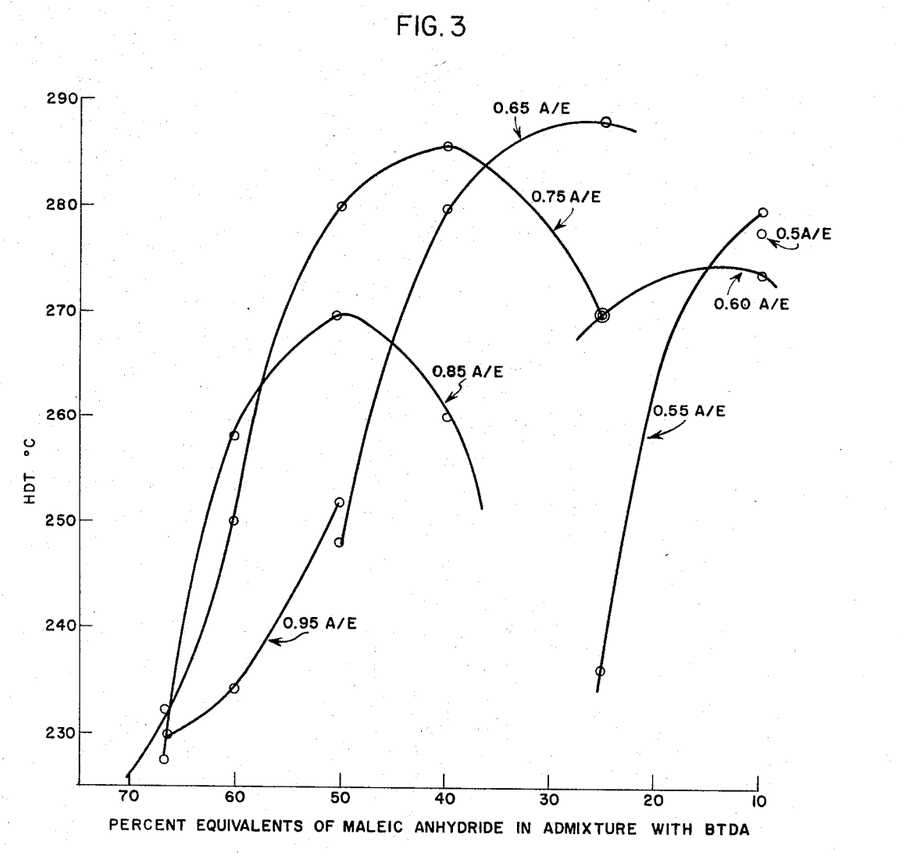
Figure 4:
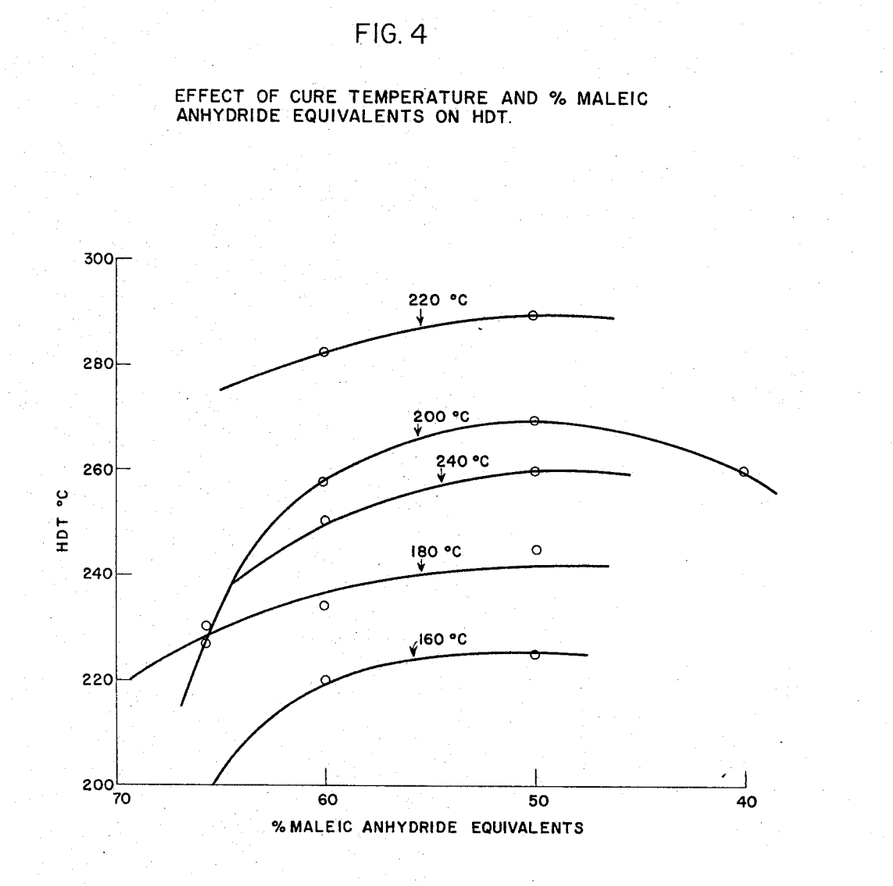

The four sheets of drawings, containing FIGS. 1 to 4 should be deleted; column 1, line 50, for "has" read -- have -- line 65, for "ary" read -- aryl --; column 2, lines 46 to 48, the formula should appear as shown below instead of as in the patent:

same column 2, line 55, strike out "is"; column 3, lines 13 and 14, for "Raynolds" read -- Reynolds --; line 61, for "tetracarboylic" read -- tetracarboxylic --; column 4, line 7, for "2,4,3′,4′-" read -- 3,4,3′,4′- --; line 48, for "tetracarboylic" read -- tetracarboxylic --; column 5, line 13, for "difficulty" read -- difficultly --; column 6, line 73, for "biary" read -- biaryl --; column 10, line 19, for "0.59" read -- 0.95 --; column 11, line 71, for "modfying" read -- modifying --.

Signed and sealed this 9th day of January 1968.

(SEAL)
Attest:

EDWARD M. FLETCHER, JR.                              EDWARD J. BRENNER
Attesting Officer                                       Commissioner of Patents